United States Patent Office 3,558,400
Patented Jan. 26, 1971

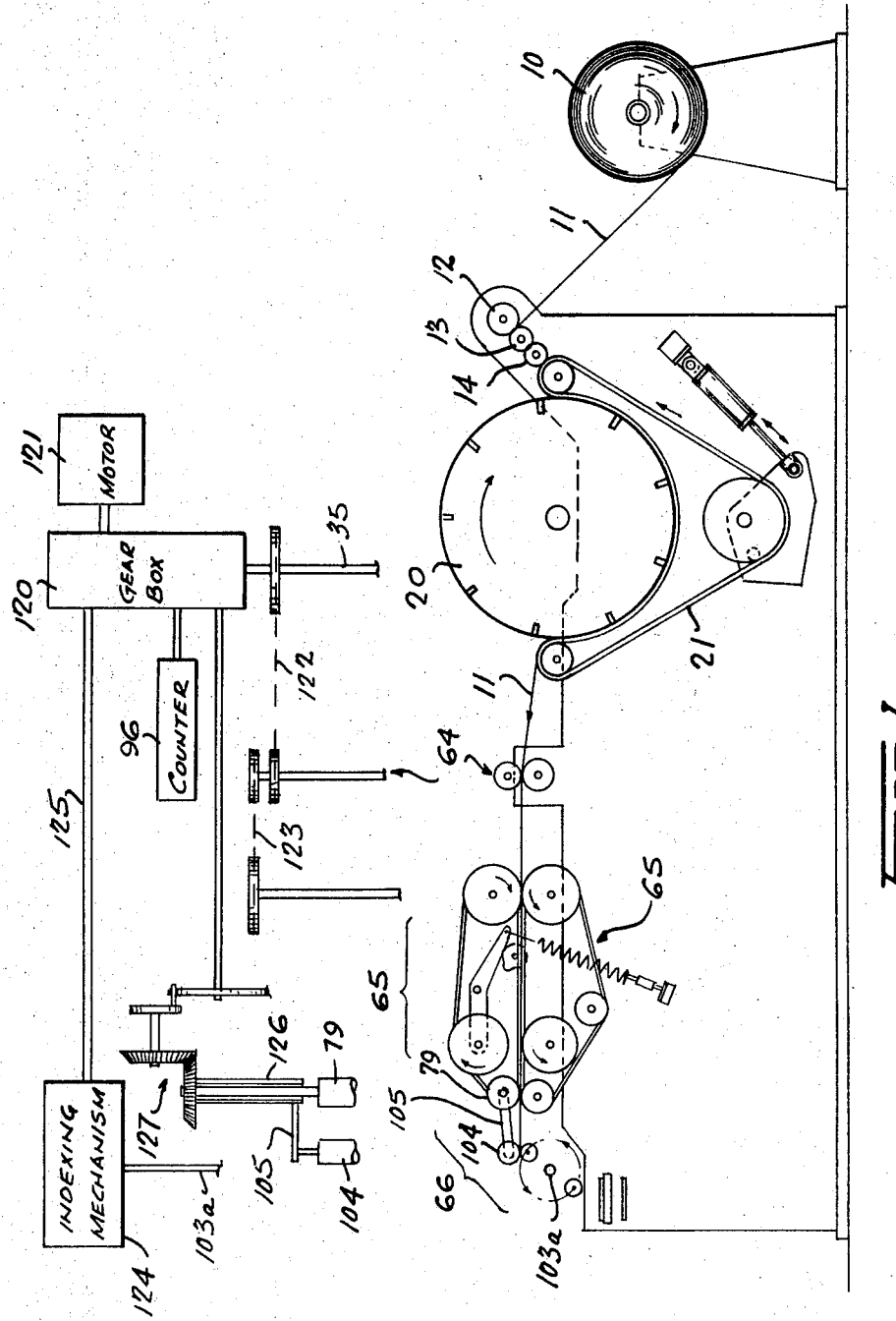

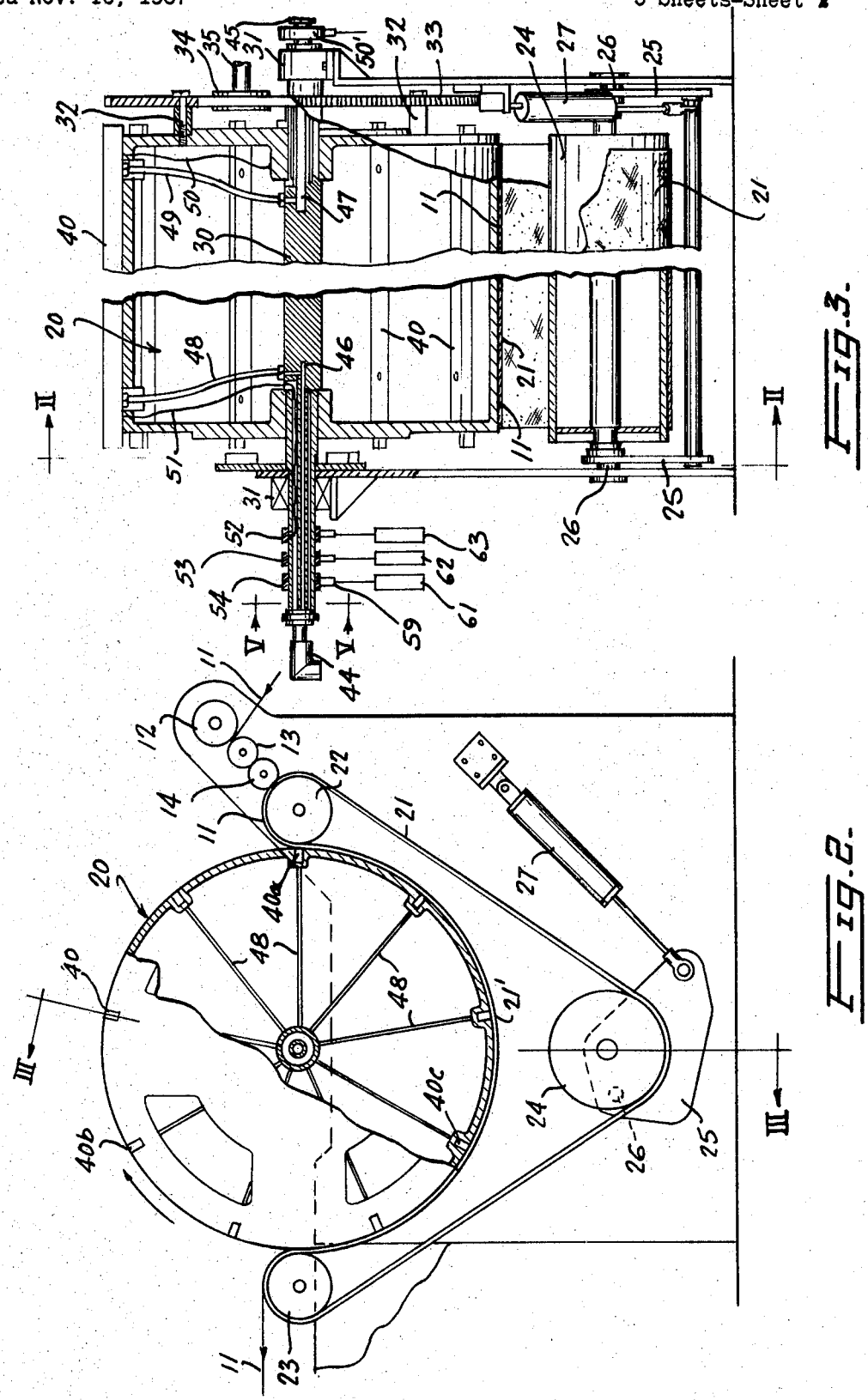

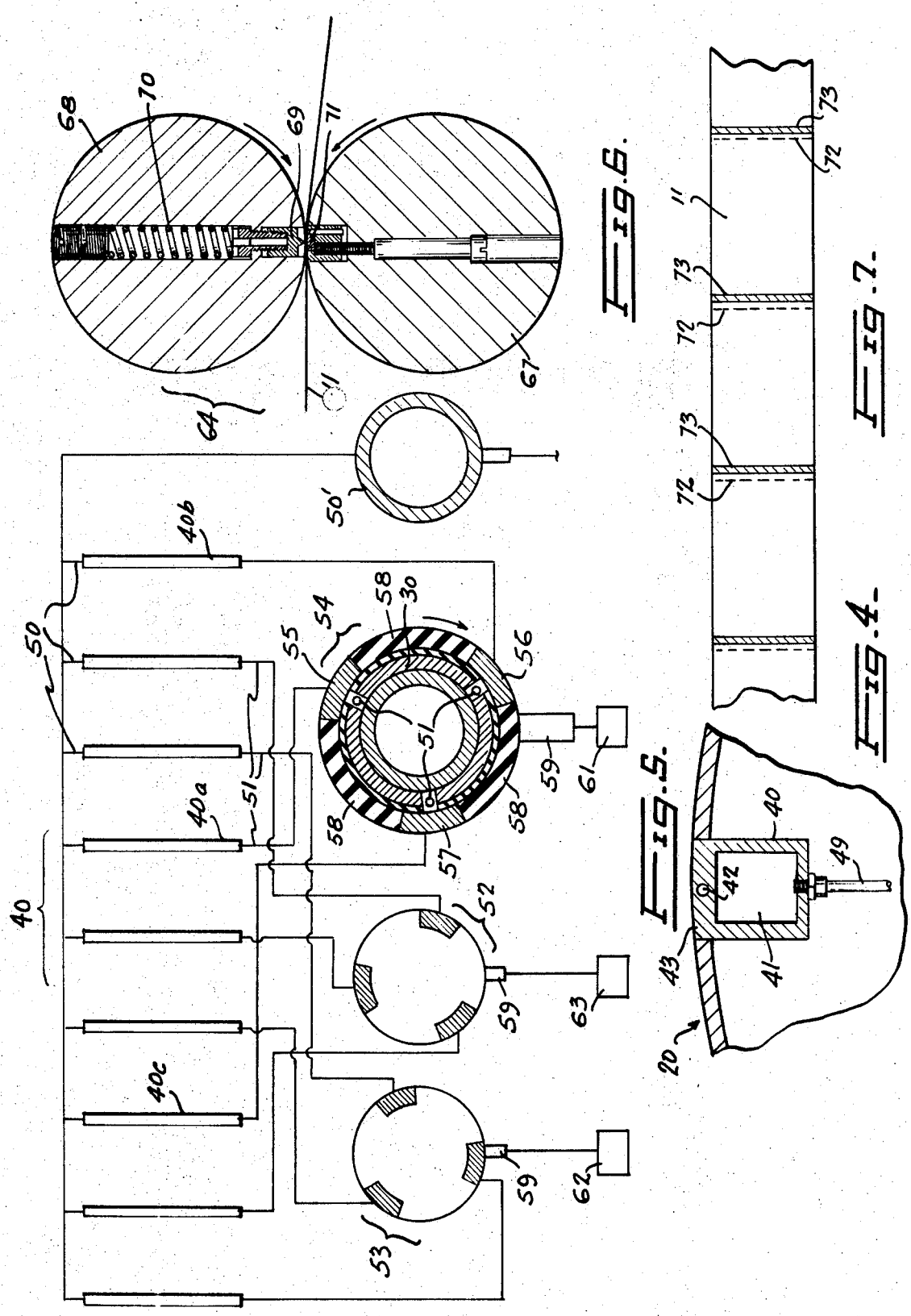

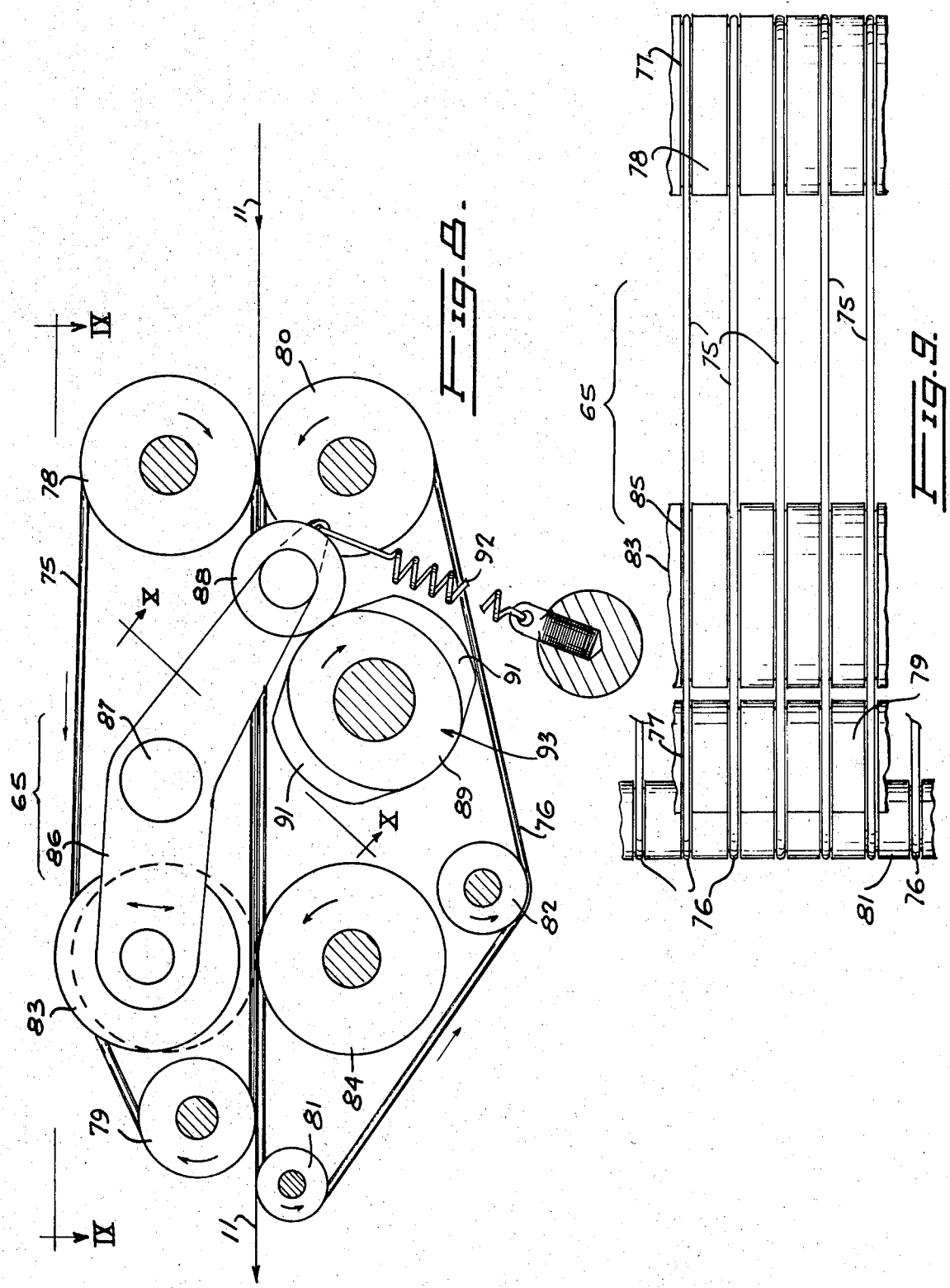

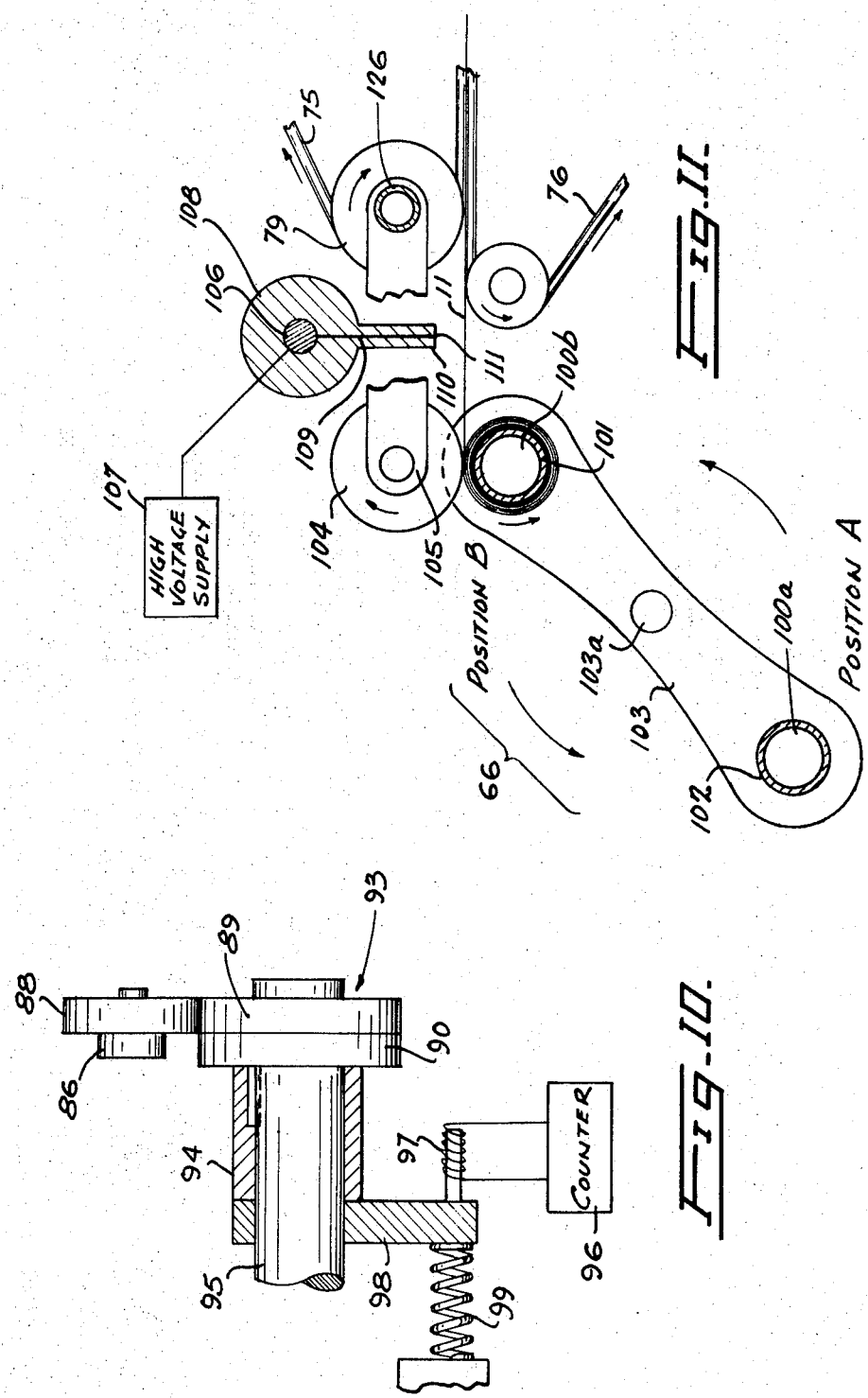

3,558,400
APPARATUS AND PROCESS FOR MAKING ROLLS OF BAGS
Steven J. Horvath and Willard O. Burgoon, both of 1021 Rangeview Road, Port Credit, Ontario, Canada, and James T. Hastings, 49 Clarence St., Brantford, Ontario, Canada
Filed Nov. 16, 1967, Ser. No. 683,706
Claims priority, application Canada, Nov. 21, 1966, 976,008
Int. Cl. B29c 27/06; B65h 75/28
U.S. Cl. 156—380                          1 Claim

ABSTRACT OF THE DISCLOSURE

The machine consists of
(a) a rotating drum around which tubes of polyethylene stock are led and heated at intervals to seal the tubes into separate bags,
(b) a perforator for making lines of perforations adjacent the seals,
(c) a separator for tearing a line of perforations occasionally to form strips of bags of a desired length, and
(d) a mechanism for winding each length of bags onto a roll,
(e) an electrostatic device being employed to aid starting of each new bag length on a roll.

---

This invention relates to apparatus and processes for the carrying out of certain steps in the manufacture of rolls of bags of polyethylene or other plastic material.

Such rolls of plastic bags are now a standard commercial product and consist basically of a tube of the plastic material, the two layers of which are sealed together at intervals along transverse lines, thus dividing the tube into separate pockets. In use, each pocket becomes an individual bag, transverse lines of perforations being provided adjacent the seals to enable the separation of each individual bag from the roll. Each bag thus incorporates one of the seals, to be closed at one end and open at the other.

The object of the present invention is to provide improvements in machines and processes for making such rolls of bags.

One example of a machine for the manufacture of bag rolls of this type is illustrated diagrammatically and by way of example in the accompanying drawings. It is to be understood that the apparatus illustrated and described is furnished by way of example only, and not by way of limitation of the invention, the broad scope of which is defined in the appended claim.

In the drawings:
FIG. 1 is a general, small-scale, side view of the entire machine, shown together with an exploded and diagrammatic plan view of drive mechanisms therefor;
FIG. 2 is a larger scale, partly broken away view of the drum portion of this machine, such view being taken on the line II—II in FIG. 3;
FIG. 3 is a section taken on the line III—III in FIG. 2;
FIG. 4 is a large scale section of a sealing bar forming part of the drum of FIGS. 2 and 3;
FIG. 5 is a diagrammatic illustration of the slip ring assemblies, the portion showing the end slip ring being taken as a section on V—V in FIG. 3;
FIG. 6 is an enlarged view of a pair of perforating rolls;
FIG. 7 shows a fragment of a formed length of bags;
FIG. 8 is an enlarged side view of a severing mechanism for separating a continuous web of bag material into individual lengths for rolling onto cores;
FIG. 9 is a view taken on the line IX—IX in FIG. 8;
FIG. 10 is a view taken on the line X—X in FIG. 8; and
FIG. 11 is a detail view of a winding mechanism.

The overall view of FIG. 1 shows a supply roll 10 from which webs 11 of stock are drawn. The webs 11 each consists of a tube of the required plastic material (e.g. polyethylene) preformed to the width desired, typically, when making sandwich bags for example, somewhere of the order of 6 to 7 inches. Obviously other widths can be used, as occasion requires. The roll 10 will normally include a number of such webs arranged side-by-side and spaced across the width of the machine, the webs lying behind one another in FIG. 1 and thus not being separately visible.

Each web 11 is fed first between rollers 12 and 13, and then around rollers 13 and 14, to pass between the lower peripheral surface of an aluminum drum 20 and a cooperating span 21' of a Teflon belt 21, as best seen from FIG. 2. The belt 21 is supported on rollers 22 and 23, located on respective sides of the drum 20, and extends around a lower roller 24. The roller 24 is mounted at each end on plates 25 (see also FIG. 3), which plates are pivotally secured to the casing of the apparatus at 26 and are acted upon by an air cylinder 27 to provide control of the tension in the belt 21.

The drum 20 has a main shaft 30 mounted in bearings 31, and is connected by bolts 32 to a large gear wheel 33 which meshes with a driving spur wheel 34 on an incoming drive shaft 35 extending from gear box 120 driven by motor 121. The showing of the drive mechanisms is basically diagrammatic throughout this disclosure, such there would be no purpose in complicating the drawings with details of these parts. It will be understood that at least some, and if desired all, of the various rollers 12 to 14 and 22 to 24 will be power driven from spur wheels meshing with the large wheel 33, such drives being at appropriate speeds to ensure that the peripheral speeds of the belt 21, the webs 11 and the drum surface are all the same as each other, in order that the webs 11 be conveyed into and around the space between the belt and the drum in such a manner that each web 11 travels with and between the peripheral surface of the drum 20 and the curved span 21' of the belt 21 with no relative movement between these three layers and with the webs held firmly against the drum surface.

Arranged around the drum 20 are nine impulse heat sealing bars 40, each of which (FIG. 4) comprises a conduit 41 along which cooling water flows and a heating wire 42 adjacent the drum surface. A Teflon cover 43 over the wire 42 defines the outer surface of the bar 40. The drum 20 is supplied with cooling water through inlet and outlet conduits 44 and 45 and hollow channels 46 and 47 in the shaft 30. Hose connections 48 and 49 conduct the water to and from the individual bars 40.

As seen in FIGS. 3 and 5, all of the wires 42 of the various sealing bars 40 are connected together and to ground at one end through electrical connections 50 connected to a common slip ring 50′. At their other ends, the respective wires 42 are connected by leads 51 in groups of three to one of three commutator slip rings 52, 53 and 54 that are mounted on an extension of the shaft 30 while being electrically insulated therefrom. As indicated typically in FIG. 5, which shows the slip ring 54 in full detail, each ring consists of three electrically conducting segments. In the case of the ring 54, these are segments 55, 56 and 57 respectively, separated from each other and from the shaft 30 by means of insulation 58. Each of the segments 55 to 57 is connected to a different lead 51, and these three leads 51 are connected respectively to the left-hand ends of the wires 42 of those bars 40 that are referred to as the first, fourth and seventh bars, namely those designated 40a, 40b, and 40c (see also FIG. 2). In a like manner, the slip ring 53 has three segments connected respectively to the second, fifth and eighth bars; while the three segments of the slip ring 52 are respectively connected to the third, sixth and ninth bars. The individual segments of each slip ring are arranged symmetrically in an 120° phase relationship to each other. As between the three slip rings, the segments are staggered in a 40° phase relationship, that is to say, the conducting segments of the slip ring 53 lag 40° behind those of slip ring 54, and those of slip ring 52 are a further 40° behind those of ring 53, this 40° relationship corresponding to the angular spacing between the bars 40 around the drum 20. Each of the slip rings cooperates with a brush 59, the three brushes being respectively connected to one of three impulse generators 61, 62 and 63 which are of a conventional type and are shown only diagrammatically in FIGS. 3 and 5.

The wire 42 of the first heat sealing bar 40a, which in FIG. 1 is shown as just about to enter into cooperation with the belt span 21′ (with the webs 11 between them) is electrically connected to the segment 56, which, as shown in FIG. 5, as just about to engage the brush 59. When these parts make contact, the impulse generator 61 discharges to heat the wire 42 of the bar 40a intensely for approximately one-tenth of a second. After this time, the segment 56 will be leaving the brush 59 and the bar 40a will have moved through approximately one quarter of its total travel in engagement with the webs 11. During this energized time the wire 42 of the bar 40a heats the webs 11 sufficiently to soften and fuse together the thermoplastic material of the two layers of each web along a transverse line. However, to form a seal strong enough to support the tension which is later applied to the webs, it is necessary for the drum 20, the webs 11, and the supporting belt span 21 to remain in their same relative position with the webs supported and not under tension for an additional three-tenths of a second cooling and hardening period. During this time the plastic material of the webs rehardens to develop sufficient tensile strength. Also, the seals joining the two layers and dividing each web into pockets become fully effective.

This remaiing three-tenths of a second time interval is occupied by travel of the bar 40a to a position adjacent the roller 23. While this cooling of the seal formed by bar 40a is taking place, successive bars 40 will have been energized for one-tenth of a second, each of the beginning of its travel with the belt span 21′. This effect is achieved by the staggered relationship between the variuos conducting segments on the slip rings 52, 53 and 54. By the time the drum has rotated through 120° and the fourth bar 40b has moved around to the position that is occupied by the first bar 40a in FIG. 2, the segment 55 will be about to make contact with the brush 59 and the associated impulse generator 61 will have had sufficient recovery time to be ready to discharge another impulse as soon as the segment 55 and brush 59 touch.

Thus, as the webs 11 leave the drum 20, they each comprise a tube of plastic material formed with a series of spaced transverse seals. The spacing between seals will equal the peripheral distance between adjacent bars 40 on the drum. As shown in FIG. 1, the webs 11 now pass through a perforator mechanism 64, and then through a separating mechanism 65 to a winding mechanism 66.

The perforator mechanism 64 is shown in detail in FIG. 6 and comprises a pair of cooperating rollers 67 and 68. Roller 68 carries a perforating cutter 69 which extends along the roller (across the full width of the machine) and is resiliently mounted in the roller 68 by a series of springs 70. The cutter 69 cooperates with an anvil surface 71 extending along the cooperating roller 67. The cutting edge of the cutter 69 is interrupted along its length so as to cut a perforated line across the web 11. The rollers 67 and 68 are driven by conventional drive means 122 from gear box 120 in synchronism with the rotation of the drum 20, so as to form a line of perforations 72 (FIG. 7) parallel to and closely spaced from each seal 73 in the web 11. FIG. 7 shows a section of a web 11 in its condition after leaving the perforator mechanism 64. As will be evident, separation along a pair of adjacent perforation lines 72 will yield a bag sealed at one end and open at the other.

Such complete separation of the web into individual bags does not, however, take place until the product is used by the consumer. The product is sold in rolls, each for example containing typically 100 bags. Therefore the only separation of the webs that is required to be made on the machine is into 100 bag lengths (or whatever other lengths are required for packaging). This result is achieved by means of the separating mechanism 65 to which the webs next pass, and which is shown in detail in FIGS. 8 and 9.

The separating mechanism 65 consists essentially of an upper series of thin belts 75 and a lower series of thin belts 76. The belts 75 run in shallow grooves 77 in driven rollers 78 and 79, and the belts 76 run in similar shallow grooves in driven rollers 80, 81 and 82. Roller 78 is driven from the gear box 120 by connection 123 and the rollers 78–82 are rotatably interconnected with each other by means not shown. The grooves 77 are of substantially the same depth as the belt thickness and the rollers are driven so that their peripheral speeds correspond to each other and to the web speed. The webs 11 in their travel through the separating mechanism 65 are thus engaged by the rollers 78, 80, 79 and 81 and supported by the belts 75 and 76, as shown in FIG. 8.

Disposed intermediate the ends of the cooperating spans of belts 75 and 76 are upper and lower rollers 83 and 84. The lower roller 84 has shallow grooves to receive the belts 76, similar to the grooves in the rollers 78 to 82, and such roller 84 travels at the same peripheral speed as the belts. The upper roller 83 has substantially deeper grooves 85 so that its peripheral surface projects beyond the belt 75, as best appreciated from FIG. 8. Since the roller 83 is rotated by its contact with the belts 75, and its peripheral speed at the bottom of its grooves 85 will thus correspond to that of the belts, its peripheral speed at its surface will be slightly greater than that of the belts and the webs. Thus, if the roller 83 is swung down into engagement with the webs 11, it will suddenly accelerate the portions of the webs with which it comes into contact. The result will be severance of the performation line 72 that happens at the time to be immediately upstream.

The roller 83 is mounted at each end on one end of a lever 86 which is pivoted at 87 and carries at its other end a cam follower 88 cooperating with a complex cam 93 comprising a first portion 89 which is circular and a second portion 90 which has a pair of rises 91. A spring 92 holds the cam follower 88 against the cam 93. As has been shown in somewhat simplified and diagrammatic form in FIG. 10 (the actual apparatus is more complicated in practice), the cam 93 is mounted on a sleeve 94 keyed to a shaft 95 that is driven at approximately the same speed as the shafts of the other rollers of the separating mechanism 65. A counter 96 driven from gear box 120 (FIG. 1) counts the number of revolutions of the drum 20 and hence the number of bags passing to the separating mechanism, and periodically energizes a solenoid 97 (when the desired number of bags for a roll of bags has passed through the machine). The solenoid 97 moves a non-rotating member 98 against the action of a tension spring 99 to slide the sleeve 94 to the right as seen in FIG. 10 to bring the second portion 90 momentarily into engagement with the cam follower 88 and thus swing the roller 83 down and sever the webs.

Downstream of the separating mechanism 65 is the winding mechanism 66 which serves to wind each length of bags as a roll onto a core. This winding mechanism 66 is conventional, except for an electrical device which has been added to cause the leading end of the web to cling to the core. The electrical device will be described in detail, but, as far as the conventional parts of the winding mechanism are concerned, it will suffice to say that this mechanism comprises a pair of winding rods 100a and 100b onto each of which a cardboard core can be slid from an unsupported end. These two rods are each movable between a loading and unloading position A and a winding position B. While a winding operation is being carried out on a core 101 mounted, for example, on the rod 100b which is at present in position B, a full core will have been removed from the rod 100a in position A and a fresh empty core 102 slid thereon.

The two rods 100a and 100b are mounted at their other ends on a rotatable farme 103 mounted on shaft 103a. The timing of the drive mechanisms is such that, during the latter part of each winding operation, that is after the fresh core 102 has been slid onto the rod 100a in position A (from the end of the rod opposite the frame 103) the frame 103 starts to rotate anticlockwise to move the rod 100a bearing the core 102 towards the winding position B. The rod 100b is simultaneously moved away from the winding position while the winding operation onto the core 101 is still in progress. Finally, just as the end of a length of bags is reached, as determined by the separating mechanism 65, the rotation of the frame 193 is completed to move the rod 100a into position B to receive the leading end of the next length of bags onto the core 102. The rod 100b now occupies position A for unloading of the filled core 101 and reloading of another empty core. At this stage in the operation, i.e. the beginning of a new roll at position B, and the unloading and reloading process at position A, the frame 103 is stationary. Subsequently it is again moved by an indexing mechanism 124 (FIG. 1), e.g. a Geneva gear box, driven from the main gear box 120 by a connection 125, to repeat the interchange of rolls between positions A and B, as already described. In addition to this movement of the frame 103, individual torque motors (not shown) are provided to drive the rolls 100a, and 100b anticlockwise, at all times except when they are in position A.

A knurled lay-on roll 104 is mounted on arms 105 extending freely from the shaft of the roller 79 and controlled by an outer shaft 126. The weight of the roll 104 normally causes it to press down lightly on the roll 100b (or 100a) in position B, to aid smooth guiding and laying on of the webs 11 onto the core 101, but shaft 126 controlled by a conventional cam operated mechanism 127 driven from gear box 120 raises the roll 104 periodically to allow a wound core (e.g. core 101) to be indexed out of position B.

The parts of the winding mechanism 66 so far described are conventional. If preferred, a more complex six shaft turret type winding head may be substituted for the simple two shaft, two position mechanism shown. A six shaft head enables the operation to be performed more quickly, but in fundamental operation it is essentially the same as the simpler mechanism shown, and thus no further description thereof will be given.

The novel electrical device which has been added to the winding mechanism is provided to improve the starting of each new roll on a core. In the past it has been found necessary either to coat the cardboard core with glue to ensure that the leading end of the web will adhere to it, or to use a much more complex laying on mechanism than the simple roll 104. The present electrical device avoids the need for either of these requirements, and yet nevertheless affords improved performance in terms of reliability and surity of proper operation.

The electrical device comprises a fixed rod 106 to which a high direct negative voltage is applied, e.g. 25 k.v., by a suitable supply 107. The rod 106 is surrounded by a heavy layer of insulation 108 through which a number of wires 109 extend from the rod 106 to a surface 110 situated just above the location of the webs 11 as they approach the winding position B. The wires 109, which are spaced along the full length of the insulator 108 so as to extend across the full width of the machine, terminate in relatively sharp ends 111. These ends 111 are such that a corona discharge will radiate from them towards the webs 11 when the rod 106 is energized at high voltage. With the rod 106 charged negatively with respect to the machine frame, the corona discharge from the wire ends 111 will build up a negative charge on the upper surface of the webs 11. The plastic material of the webs, e.g. polyethylene, being an excellent insulator, a corresponding positive charge will be induced on the under surface of the webs and those surface charges will remain insulated from each other by the webs themselves. The effect of the positive charge will be to cause the undersurface of the webs to be strongly attracted to the uncharged cardboard core on the winding rod at position B and to cling tenaciously to such core. It has been found that in this way each roll is firmly and reliably started on the new core, without the need for mechanical or chemical connection, e.g. glue, between the webs and the core. The core is, of course, rotating at this time and, after a turn or two of web has been wound onto the core, the remainder will be drawn on by previous turns. The electrostatic charge induced on the underside of the webs by the corona discharge radiated onto their upper surfaces is only required just at the moment when a new leading web end emerges from the separating mechanism 65 and approaches the winding roll at position B, for which reason the high voltage supply 107 is connected to the drive and timing mechanism for brief actuation at this moment in the machine cycle.

We claim:

1. Apparatus for forming transverse seals in a continuous, elongated tubular web of thermoplastic material, comprising
   (a) a drum having a plurality of circumferentially spaced, axially extending sealing elements disposed around and embedded in the peripheral surface of said drum, each said sealing element including heating means and cooling means;
   (b) a belt, means mounting said belt with a span thereof firmly engaging an arcuate portion of said peripheral surface, and means for tensioning said belt to control pressure exerted on said surface by said belt span;
   (c) means for rotating said drum and for driving said belt with the same peripheral speed as each other;
   (d) means for feeding a continuous flat web of thermoplastic tube between the drum and said belt span on the upstream side thereof and for guiding said web from between the drum and said span at the downstream side thereof, whereby to bring each of a plurality of transversely extending strips of the web into temporary intimate contact with a respective one of said sealing elements for a path of travel during which said web is supported between the drum surface and said span without relative movement there-between and the web is held solely by the belt span firmly against said drum surface to preclude longitudinal tension in said web;

(e) timing means operated in synchronism with said drum for momentarily actuating the heating means of each sealing element substantially as it commences said path of travel to soften the material of said web along a said strip;

(f) and means operating the cooling means of each sealing element to cool, harden and seal together the softened surfaces of said web along each said strip during the remainder of said path of travel.

References Cited

UNITED STATES PATENTS

| 2,576,047 | 11/1951 | Schaffert | 242—74X |
| 2,952,299 | 9/1960 | Finke | 156—510 |
| 3,004,881 | 10/1961 | Van Der Meulen | 156—290X |

BENJAMIN A. BORCHELT, Primary Examiner

J. J. DEVITT, Assistant Examiner

U.S. Cl. X.R.

156—510; 242—74